US012661816B2

(12) United States Patent
Boram

(10) Patent No.: US 12,661,816 B2
(45) Date of Patent: Jun. 23, 2026

(54) REPLACEABLE BLADE MECHANISM

(71) Applicant: Joshua Boram, College Place, WA (US)

(72) Inventor: Joshua Boram, College Place, WA (US)

(*) Notice: Subject to any disclaimer, the term of this patent is extended or adjusted under 35 U.S.C. 154(b) by 315 days.

(21) Appl. No.: 18/444,355

(22) Filed: Feb. 16, 2024

(65) Prior Publication Data

US 2025/0262779 A1 Aug. 21, 2025

(51) Int. Cl.

*B26B 5/00* (2006.01)
*B26B 1/04* (2006.01)
*B26B 11/00* (2006.01)

(52) U.S. Cl.

CPC .................. *B26B 5/00* (2013.01); *B26B 1/04* (2013.01); *B26B 11/001* (2013.01)

(58) Field of Classification Search

CPC .... B26B 1/00; B26B 1/02; B26B 1/04; B26B 3/00; B26B 5/00; B26B 5/003; B26B 5/005; B26B 5/006; B26B 5/007; B26B 11/001

USPC ........................................................... 30/156

See application file for complete search history.

(56) References Cited

U.S. PATENT DOCUMENTS 1,813,723 A * 7/1931 Beaver ...................... B26B 5/00 30/162
2,213,292 A * 9/1940 Testi ......................... B26B 1/02 30/156
2,523,575 A * 9/1950 Kassel .................... B26B 5/006 30/156
3,965,575 A * 6/1976 Stunger ..................... B26B 5/00 30/294
4,011,657 A * 3/1977 Vance ....................... B26B 5/00 30/337
4,169,312 A * 10/1979 Mar .......................... B26B 5/00 30/337
4,425,709 A * 1/1984 Quenzi ..................... B26B 5/00 30/151
5,009,008 A * 4/1991 Yablonovitch ............ B26B 1/02 30/321
5,027,512 A * 7/1991 Andrews ................... B26B 5/00 30/169
5,689,889 A * 11/1997 Overholt ................... B26B 5/00 30/329
6,058,611 A * 5/2000 Rickard .................... B26B 5/00 30/340
6,263,581 B1 * 7/2001 Forte ......................... B26B 5/00 30/329
6,321,455 B1 * 11/2001 Burchell ................... B26B 5/00 30/340

(Continued)

*Primary Examiner* — Jason Daniel Prone

(57) ABSTRACT

The device is a tool holder capable of holding various types of tools. The device uses a cam lock mechanism designed to quickly attach and detach the tool from the tool holder. The cam lock cinches down on the shank of the tool, which virtually eliminates any play or movement during hard use. To replace the tool, the user deactivates the cam lock by pressing upward on the cam lever. In turn, the cam lobe rotates and slides out of a recessed portion of the shank. This unlocks the shank and allows the user to freely slide the tool out of the tool holder. To prevent the cam lock from accidentally unlocking during normal use, the device also incorporates a safety lock mechanism. The safety lock requires the user to first press and hold down a button next to the cam lock before disengaging the cam lock mechanism.

13 Claims, 10 Drawing Sheets

(56) References Cited

U.S. PATENT DOCUMENTS

| | | | | |
|---|---|---|---|---|
| 6,446,341 | B1 | 9/2002 | Wang et al. | |
| 6,574,868 | B1 * | 6/2003 | Overholt | B26B 5/00 30/329 |
| 6,701,626 | B2 * | 3/2004 | Knoop | B26B 5/00 30/337 |
| 7,020,969 | B2 * | 4/2006 | Roberson | B26B 5/00 30/152 |
| 7,036,229 | B1 * | 5/2006 | Demko | B26B 1/02 30/160 |
| 7,900,363 | B1 * | 3/2011 | White | B26B 5/00 30/340 |
| 8,499,460 | B1 | 8/2013 | Pearman | |
| 8,978,254 | B1 * | 3/2015 | White | B26B 5/00 30/340 |
| 10,493,641 | B2 * | 12/2019 | Bloch | B26B 5/00 |
| 11,090,820 | B1 * | 8/2021 | Wu | B26B 1/02 |
| 11,370,132 | B2 * | 6/2022 | Tsai | B26B 5/00 |
| 11,602,864 | B1 * | 3/2023 | Perkins | B26B 1/02 |
| 11,618,174 | B2 * | 4/2023 | Kao | B26B 5/00 30/156 |
| 11,642,801 | B1 * | 5/2023 | Dovel | B26B 5/003 30/162 |
| 11,707,858 | B1 * | 7/2023 | Mon | B26B 5/006 30/156 |
| 11,969,909 | B2 * | 4/2024 | Dovel | B26B 5/00 |
| 11,999,073 | B2 * | 6/2024 | Horne | B26B 5/00 |
| 12,030,204 | B1 * | 7/2024 | Lazenby | B26B 11/001 |
| 12,330,324 | B2 * | 6/2025 | Zhang | B26B 5/00 |
| 2005/0252010 | A1 | 11/2005 | Freeman | |
| 2005/0278955 | A1 * | 12/2005 | Lee | B26B 5/00 30/153 |
| 2010/0018060 | A1 * | 1/2010 | Lin | B26B 5/00 30/151 |
| 2014/0259686 | A1 | 9/2014 | Garavaglia et al. | |
| 2020/0307002 | A1 | 10/2020 | Leong et al. | |
| 2020/0331159 | A1 * | 10/2020 | Yoo | B26B 5/006 |
| 2023/0405852 | A1 * | 12/2023 | Douglas | B26B 5/00 |
| 2024/0017432 | A1 * | 1/2024 | Zhang | B26B 5/00 |
| 2024/0066724 | A1 * | 2/2024 | Wu | B26B 5/00 |
| 2024/0100723 | A1 * | 3/2024 | Germann | B26B 5/00 |
| 2024/0100724 | A1 * | 3/2024 | Germann | B26B 5/00 |

* cited by examiner

REPLACEABLE BLADE MECHANISM

FIELD OF THE INVENTION

The present invention relates generally to blade holders. More specifically, the present invention is a tool holder that incorporates a quick-release mechanism for replacing a tool.

BACKGROUND OF THE INVENTION

Blade holders are commonly used in various applications including folding knives, scrapers, and retractable blades. Blade holders are designed to hold a disposable blade in a fixed position during use. Because blades typically wear out over time, the blades can be replaced without having to replace the blade holder. One of the drawbacks to using a blade holder is the amount of time it takes to replace the blade. Oftentimes, blade holders are subject to high stress loads. To prevent the blade from separating from the blade holder, fasteners are commonly used to attach the blade. This requires the use of a separate tool for removing and reattaching the fasteners that hold the blade in place.

Some manufacturers have attempted to solve this problem by incorporating a quick-release mechanism in lieu of fasteners. But these types of blade holders lack the rigidity needed to hold the blade firmly in place. Oftentimes, there is a large amount of play and movement of the blade during hard use, making it difficult to handle. This can also pose a risk of injury to the user if the quick-release mechanism fails or disengages from the blade during hard use.

It is an objective of the present invention to provide a solution to the aforementioned problems. The present invention is a quick-release, tool-free, tool holder capable of holding various types of tools while minimizing the play or movement of the tool while attached.

SUMMARY

The present invention is a quick-release, tool-free, tool holder ("tool holder assembly" hereafter) that is capable of holding various types of tools. The tool holder assembly incorporates a cam lock mechanism designed to quickly replace a blade, a knife, a scraper, or any other tool without the use of fasteners. To accomplish this, the shank of the tool is uniquely shaped by incorporating a cantilever and at least one slot. The slot or slots interlock with corresponding raised sections on the tool holder. To lock the shank in place, the cantilever engages with a cam lobe and a lobe on the upper raised section. When the cantilever is fully inserted and the cam lock is activated, the cam lobe engages with a divot on the top side of the cantilever. At the same time, the lobe on the upper raised section engages with a second divot located on the lower side of the cantilever. These two engagements firmly hold the cantilever in place, thereby preventing the tool from sliding out. This unique arrangement minimizes any play or movement of the tool during hard use.

When ready to replace the tool, the user deactivates the cam lock by simply pressing upward on the cam lever. In turn, the cam lobe rotates and slides out of the divot. This unlocks the cantilever and allows the user to freely slide the tool out of the tool holder. To prevent the cam lock from accidentally disengaging during normal use, the present invention also incorporates a safety lock mechanism. The safety lock requires the user to first press and hold a button next to the cam lock before engaging the cam lock.

In another configuration, the present invention can be configured to function as a folding knife. In this configuration, a clevis joint is integrated into the main body of the tool holder. The clevis joint is designed to fit a pivot pin commonly used in folding knife handles. Once attached, the user can open and close the tool holder in the same manner as a traditional folding knife.

In another configuration, the present invention incorporates a thumb stud. The thumb stud is shaped identical to the cam lever and is positioned on the opposite side of the cam lever. This arrangement not only enhances the overall appearance of the present invention, but also improves the ergonomic handling when used in a folding knife configuration.

DETAIL DESCRIPTIONS OF THE INVENTION

All illustrations of the drawings are for the purpose of describing selected versions of the present invention and are not intended to limit the scope of the present invention.

Hereinafter, the terms "tool holder" and "tool holder assembly" are used interchangeably without departing from the spirit and scope of the invention. Specifically, a "tool holder" refers to a "tool holder assembly" without the tool attached. Likewise, a "tool holder assembly" refers to a "tool holder" with the tool attached.

Figure 1:
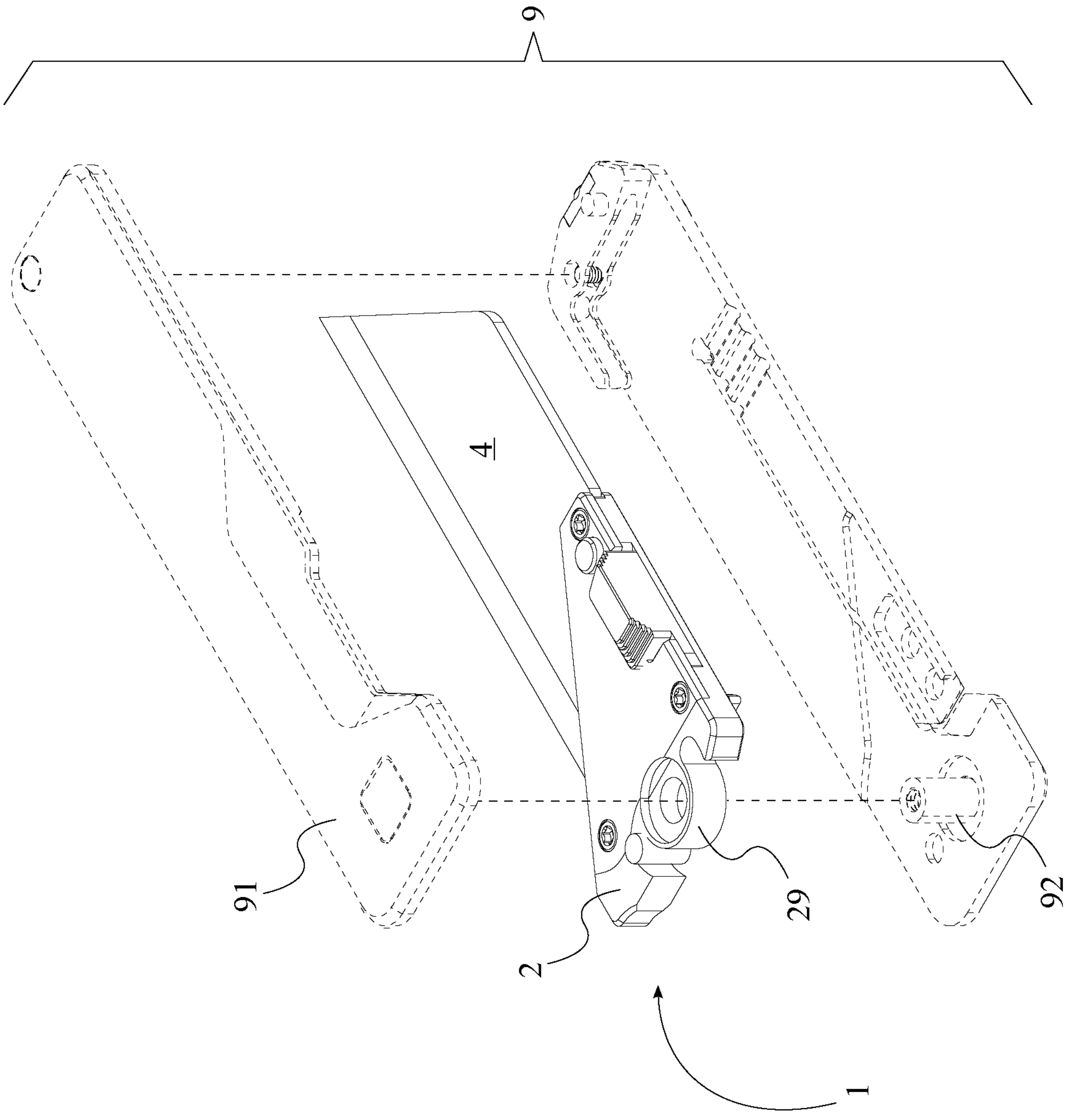
FIG. 1 is a top-front-left perspective exploded view of the present invention, shown in a folding knife configuration.
Figure 2:
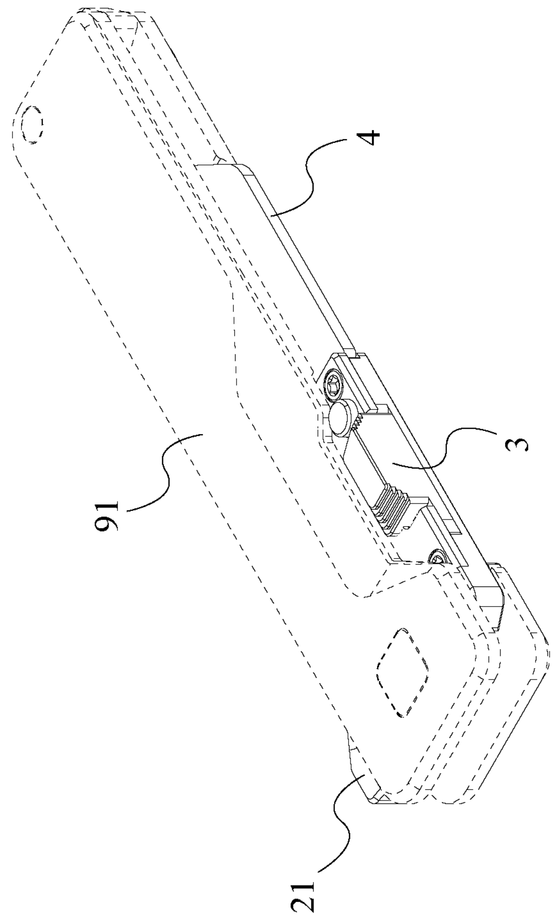
FIG. 2 is a top-front-left perspective view of the present invention, shown in a locked position with the tool folded.
Figure 3:
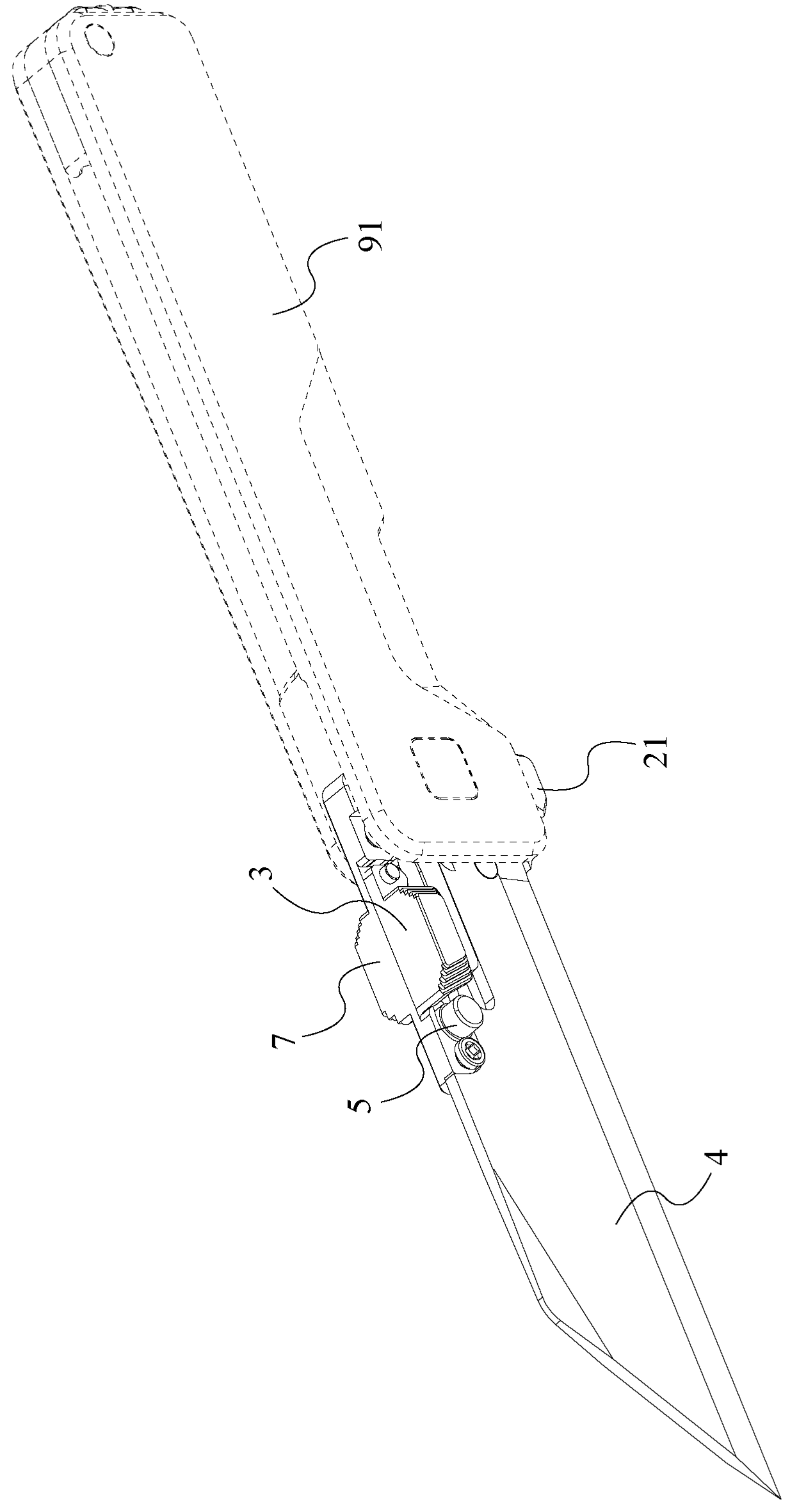
FIG. 3 is a top-front-left perspective view of the present invention, shown in a locked position with the tool unfolded.
Figure 4:
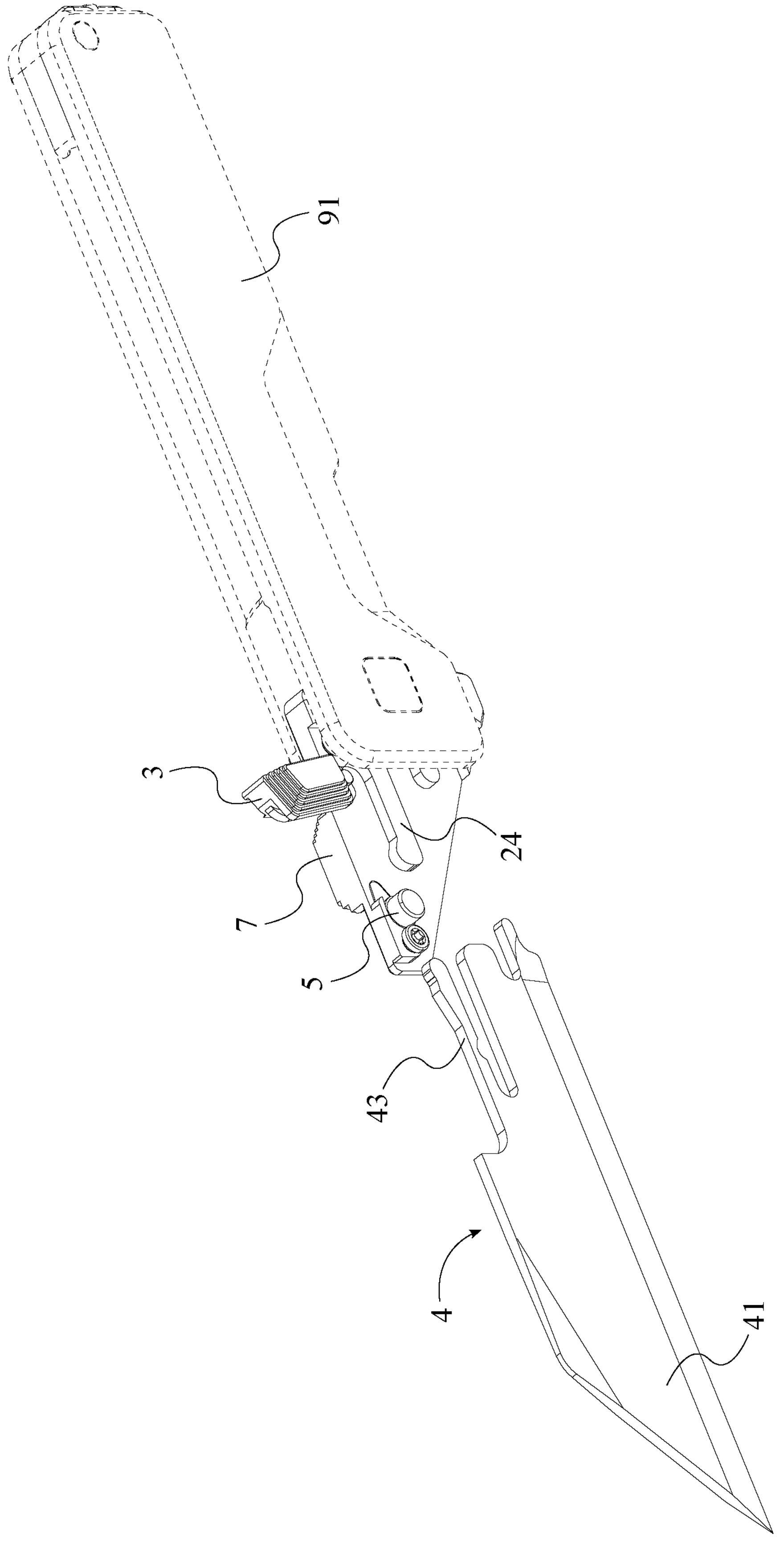
FIG. 4 is a top-front-left perspective view of the present invention, shown in an unlocked position with the tool removed.

In reference to FIG. 1 through FIG. 10, the present invention is a quick-release, tool free, tool holder capable of holding various types of tools. More specifically, the present invention is a tool holder assembly 1 that allows the user to easily replace one tool for another without having to use a separate tool during tool replacement. The present invention incorporates a unique cam lock mechanism that cinches down on the shank 42 of the tool 4. This virtually eliminates any play or movement during hard use of the tool 4. The tool holder assembly 1 can be adapted to fit on various types of handles, including but not limited to a folding knife 9 as seen in FIGS. 1-4. In this embodiment, the tool holder assembly 1 contains a clevis joint 29 that attaches to an existing pivot pin 92 located on the handle 91 of the folding knife 9. As can be seen in FIGS. 2-3, the user can operate the folding knife 9 in the same manner as a traditional folding knife. Specifically, the user can either unfold the tool holder assembly 1 outward into an open position or fold the tool holder assembly 1 in a closed position. As seen in FIG. 4, the user can quickly remove the tool 4 by engaging the cam lock mechanism.

To remove the tool 4 from the tool holder 1, the user must first disengage the cam lock 3. This is performed by pressing upward on the cam lever 31 until the cam lever 31 is in the vertical upright position, as seen in FIG. 4. The upright position indicates the tool 4 is unlocked, which allows the user to slide the tool 4 freely out of the tool holder 1. To attach a new tool 4 to the tool holder, the user simply follows the same steps above in reverse order. Specifically, the user first verifies that the cam lever 31 is in the upright vertical position. The upright position indicates the tool holder is unlocked and configured to receive a new tool 4. Next, the user slides the tool 4 into the tool holder until the tool 4 is firmly seated in place. Lastly, the user engages the cam lock 3 by pressing down on the cam lever 31 until the cam lever 31 is in the horizontal position (i.e., parallel with the tool), as seen in FIG. 3. The horizontal position indicates the tool 4 is secured to the tool holder and locked in place. Once locked, the user can now use the new tool 4 as intended.

In a preferred embodiment, the present invention further comprises a safety lock 5. The safety lock 5 secures the cam lever 31 in the horizontal and locked position until the safety lock 5 is disengaged by the user. The purpose of the safety lock 5 is to prevent the cam lock 3 from inadvertently unlocking itself. This can happen when the user accidently presses or bumps the cam lock lever 31 out of the locked position. The unique design of the safety lock 5 eliminates any chance for the cam lever 31 to slip out of place during hard use of the tool 4, thereby avoiding serious injury to the user. When ready to replace the tool, the user first holds down the button 51 to deactivate the safety lock 5. While the safety lock 5 is deactivated, the user can now unlock the tool 4 by rotating the cam lock 3 into the vertical upright position, as seen in FIG. 4. Once unlocked, the user can safely remove the tool from the tool holder.

Figure 5:
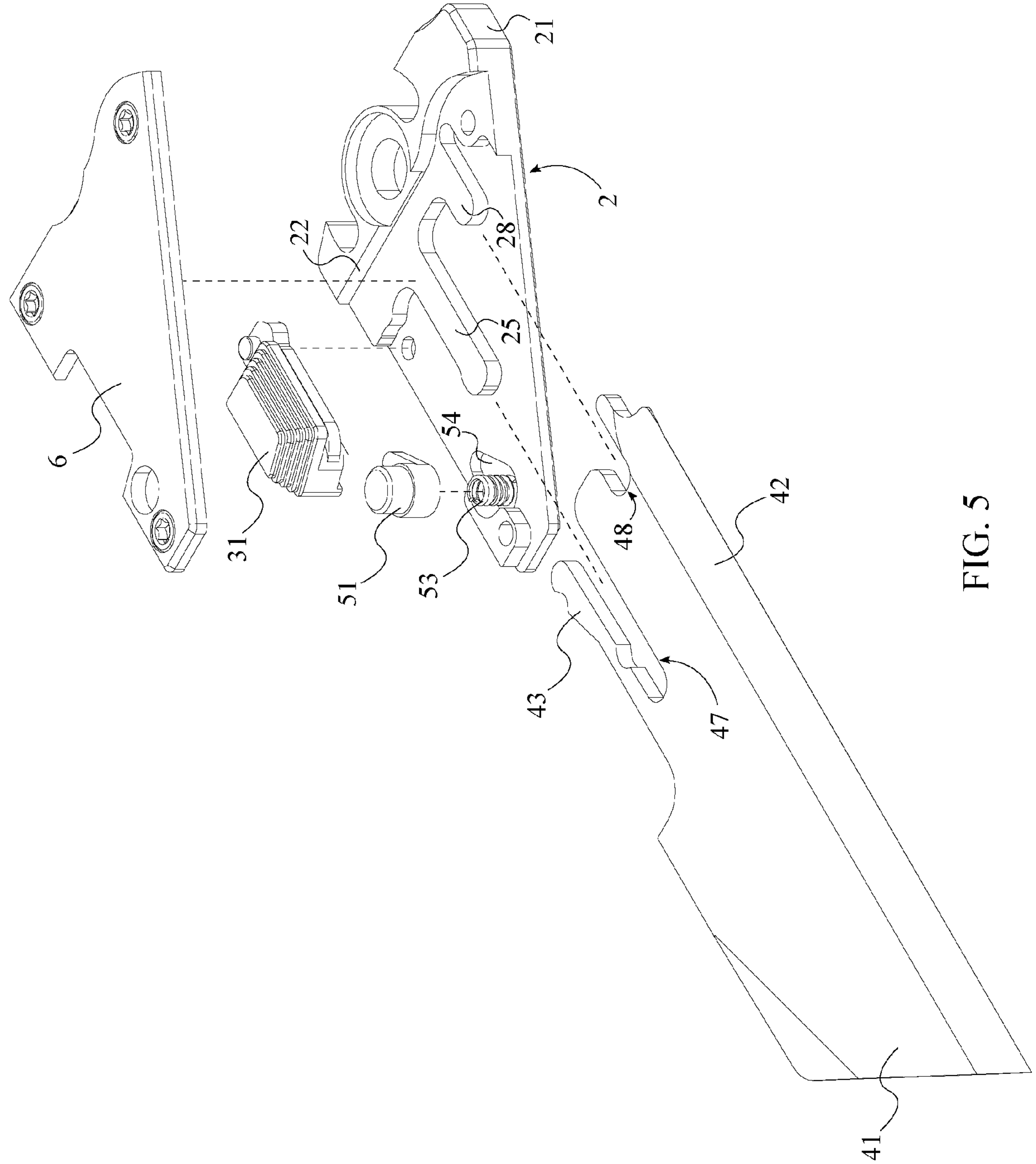
FIG. 5 is a top-front-left perspective exploded view of the present invention.
Figure 6:
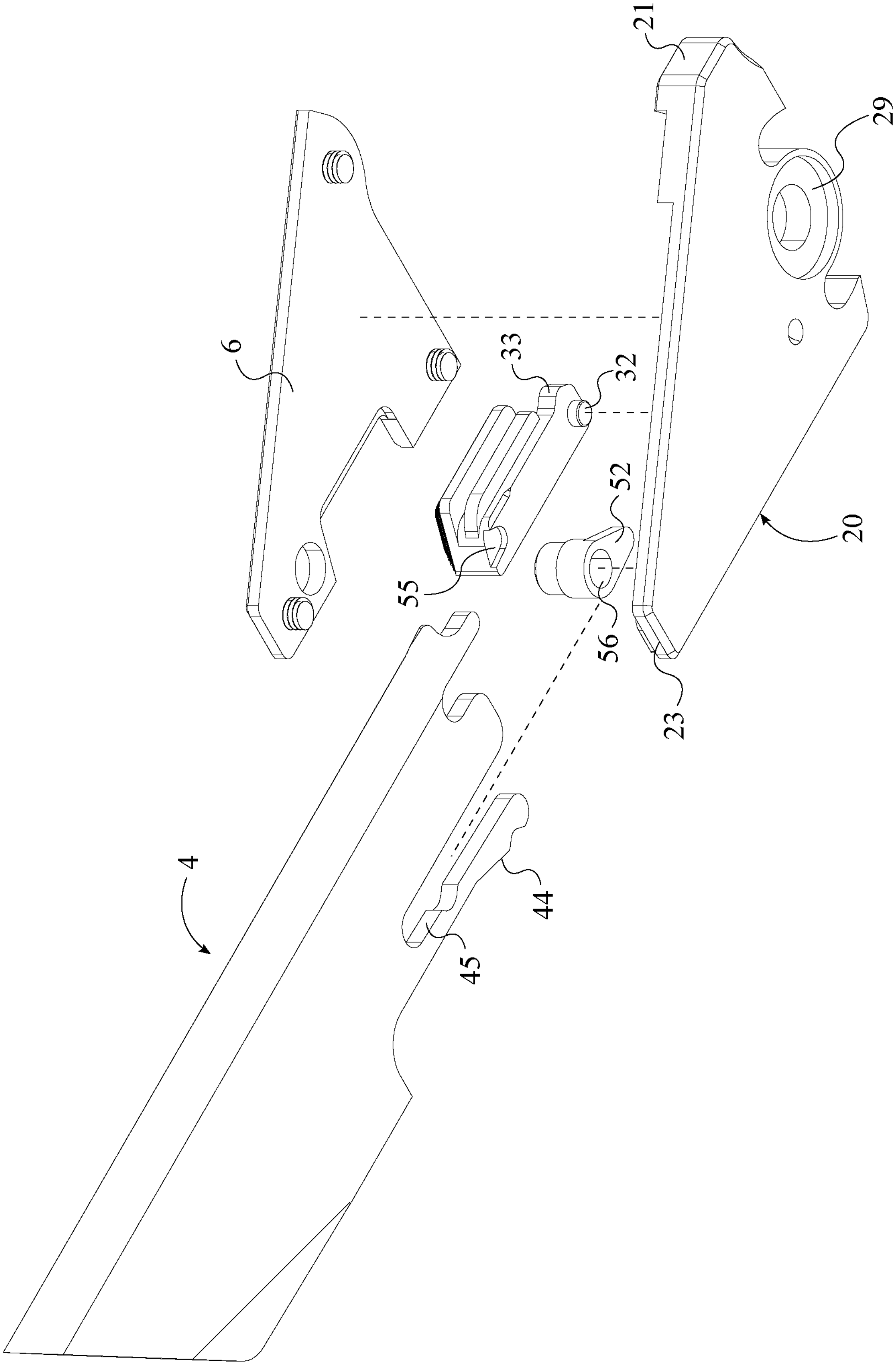
FIG. 6 is a bottom-front-left perspective exploded view of the present invention.
Figure 7:
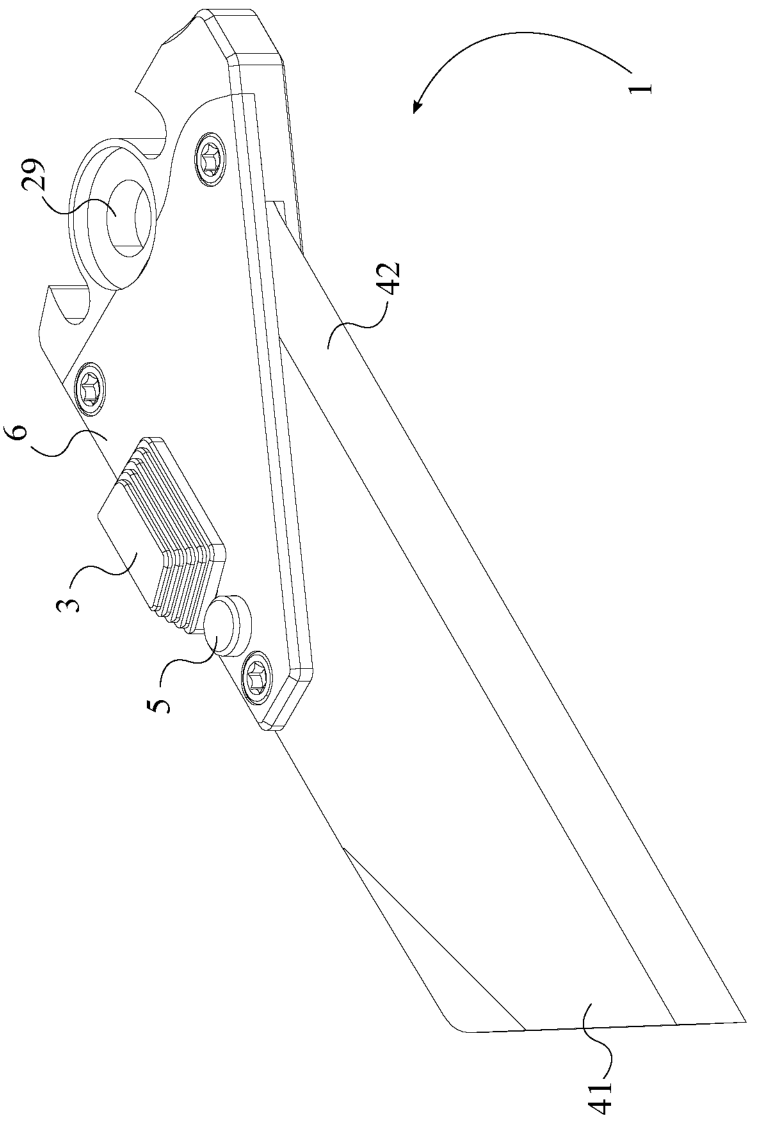
FIG. 7 is a top-front-left perspective view of the present invention.

In order to perform the functions described above, the tool holder assembly 1 comprises a main body 2, a cam lock 3, and a tool 4. As best seen in FIG. 5, the main body 2 functions as the primary structural component of the present invention, as the remaining components of the present invention are configured upon the main body 2. The main body 2 is preferably made from a durable, high-strength material including but not limited to stainless steel. Moreover, the main body 2 can take the form of any suitable shape based on design, user, and or manufacturing requirements.

Figure 8:
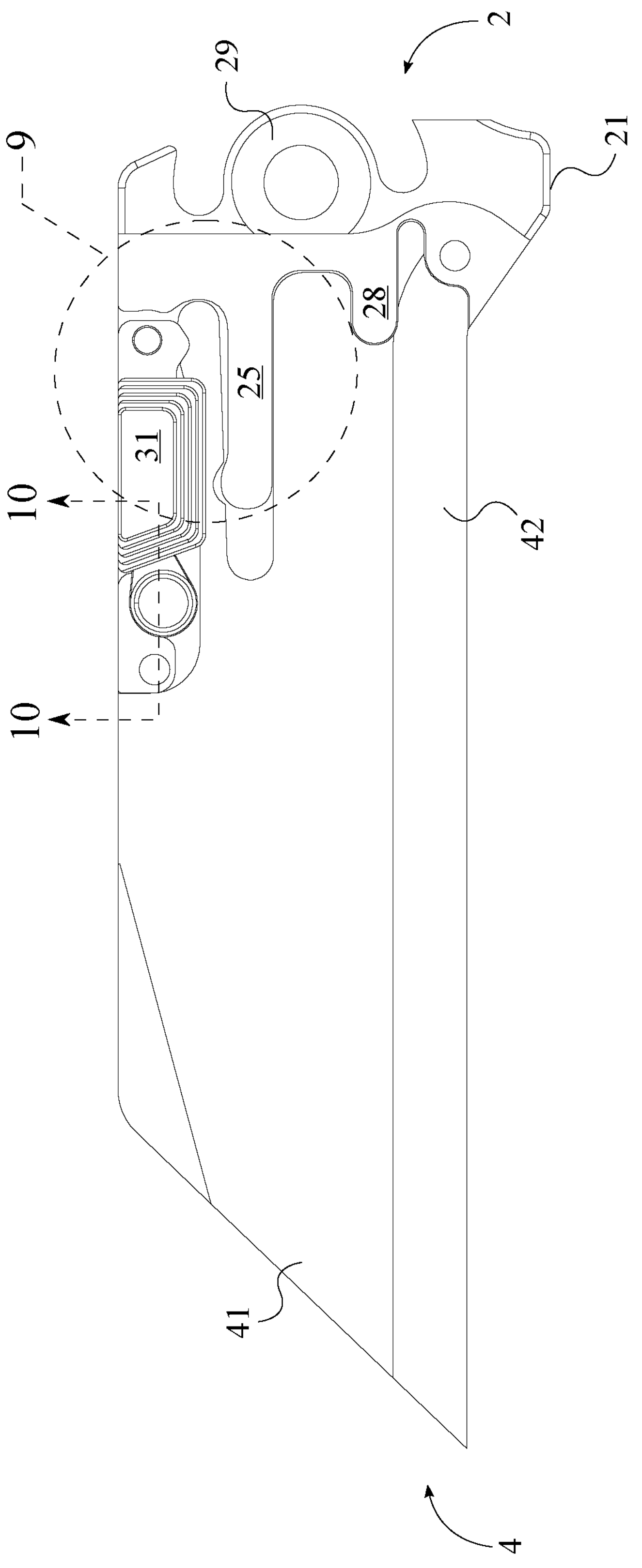
FIG. 8 is a front elevational view of the present invention, shown without the cover.

The main body 2 further comprises a first outer side 20, a second outer side 21, a proximal end 22, a distal end 23, and at least one raised section 24. As best seen in FIG. 8, the at least one raised section 24 extends longitudinally outward from the proximal end 22 towards the distal end 23 of the main body 2. A first raised section 25 of the at least one raised section 24 is oriented parallel with the first outer side 20, offset by a predefined length L1. The cam lock 3 is pivotally connected to the main body 2, positioned along the first outer side 20. For maximum engagement, the cam lock 3 is preferably positioned closest to the proximal end 22 of the main body 2. The arrangement between the cam lock 3 and the first raised section 25 provides proper clearance to receive and attach the tool 4 to the main body 2.

Figure 9:
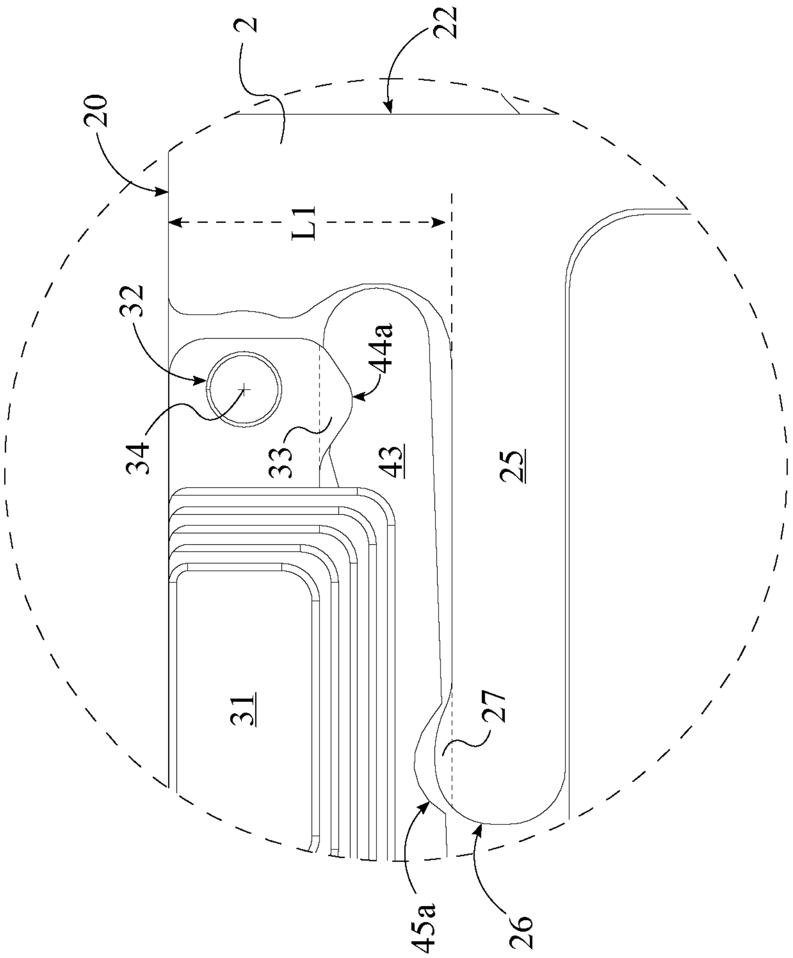
FIG. 9 is a magnified view taken from FIG. 8, showing the cam lock feature.
Figure 10:
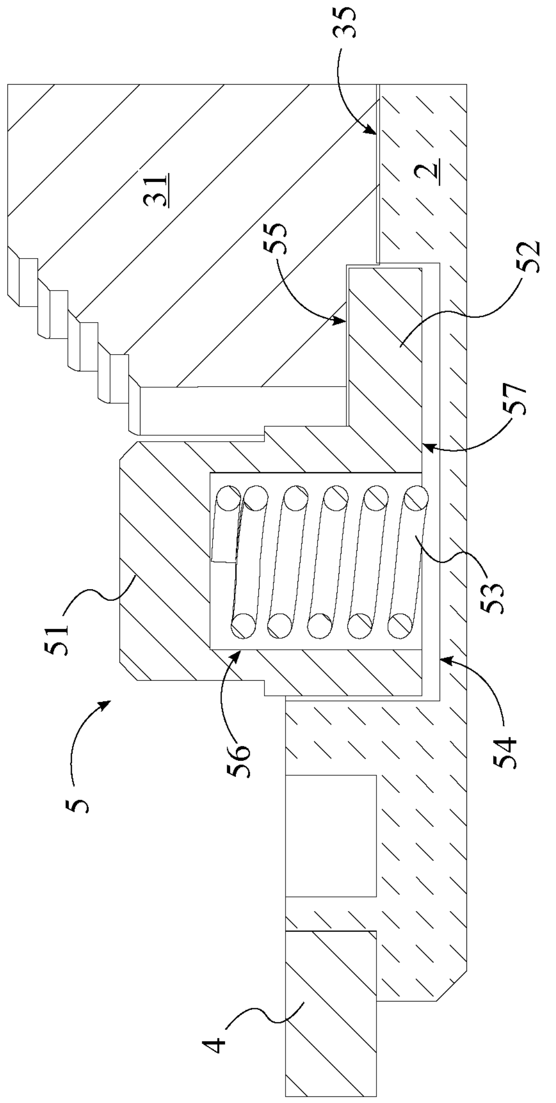
FIG. 10 is an enlarged, cross-sectional view taken along lines 10-10 in FIG. 8, showing the safety lock feature.

The tool 4 further comprises a head 41 and a shank 42. Both the head 41 and the shank 42 each extend longitudinally outward, opposite of each other. As best seen in FIG. 5, the shank 42 is shaped to engage with the main body 2. In particular, the shank 42 further comprises a cantilever 43 and a first slot 47. The first slot 47 is disposed adjacent to the cantilever 43. The first slot 47 is contoured to engage with the first raised section 25 of the main body 2. As best seen in FIG. 9, the cantilever 43 is positioned in between the cam lock 3 and the first raised section 25, such that the cantilever 43 is operably connected to the cam lock 3. In this arrangement, the cam lock 3 is capable of detachably connecting the shank 42 to the main body 2. More specifically, the shank 42 is secured to the main body 2 when the cantilever 43 is fully inserted and the cam lock 3 is in the locked position. The shank 42 is detached from the main body 2 when the cam lock 3 is moved to the unlocked position. In the unlocked position, the user can then slide the tool 4 out and away from the main body 2.

In reference to FIG. 9, the cam lock 3 further comprises a cam pivot 32, a cam lever 31, and a cam lobe 33. The cam lobe 33 is terminally connected to the cam lever 31, and the cam lever 31 is terminally connected to the cam pivot 32. The cam pivot 32 is pivotally connected to the main body 2. Both the cam lever 31 and the cam lobe 33 each extend outward, perpendicular to the rotational axis 34 of the cam pivot 32. In the preferred embodiment, the cam lobe 33 is oriented orthogonal to the cam lever 31. However, in other embodiments, the cam lobe 33 may form an acute or obtuse angle with the cam lever 31.

In order to lock and unlock the tool 4 from the main body 2, the cam lobe 33 is operably connected to the cantilever 43. More specifically, a cam lobe recess **44*a* is disposed on a first surface 44 of the cantilever 43. The cam lobe 33 is operably coupled to the cam lobe recess 44*a*, such that when the cam lock 3 is in the locked position, the cam lobe 33 is positioned within the cam lobe recess 44*a*. This arrangement prevents the cantilever 43 from sliding out of the locked position. When the cam lock 3 is moved into the unlocked position, the cam lobe 33 is forced out of the cam lobe recess 44*a* which in turn, releases the engagement on the cantilever 43. This allows the user to freely slide the shank 42 out of the main body 2**.

In the preferred embodiment, both the cam lock 3 and the first raised section 25 are operably connected to the cantilever 43. In this embodiment, the first raised section 25 further comprises a raised lobe 27. The raised lobe 27 is positioned on a distal end 26 of the first raised section 25, extending upward in the direction of the cantilever 43. A corresponding raised lobe recess **45*a* is disposed on a second surface 45 of the cantilever 43. The raised lobe 27 is operably coupled to the raised lobe recess 45*a*, such that when the cam lock 3 is in the locked position, the raised lobe 27 is positioned within the raised lobe recess 45*a*. This arrangement increases the locking capability of the cam lock 3 due to the additional resistive force applied on the second surface 45 of the cantilever 43 by the raised lobe 27**.

In the preferred embodiment, the tool holder assembly 1 further comprises a safety lock 5. As previously mentioned, the safety lock 5 ensures that the cam lock 3 does not inadvertently disengage during hard use of the tool 4. A disengagement during hard use can cause serious injury to the user. In reference to FIG. 10, the safety lock 5 further comprises a button 51, an engagement arm 52, and a spring 53. The spring 53 is preferably a coil spring. However, other types of springs may be employed, including but not limited to a conical spring and a compression spring. The engagement arm 52 is terminally connected to the button 51, extending planarly outward from a base surface 57 of the button 51. The button 51 is positioned on the main body 2, adjacent to the cam lock 3. Both the button 51 and the engagement arm 52 are positioned within a first recess 54 disposed on the main body 2. The engagement arm 52 extends into a second recess 55 disposed at a base surface 35 of the cam lever 31. The spring 53 is positioned within a third recess 56 disposed at the base surface 57 of the button 51. The safety lock 5 automatically activates when the cam lock 3 is in the locked position and no force is applied on the button 51. More specifically, the spring force applies upward pressure on the button 51. This causes the engagement arm 52 to slide into the second recess 55 of the cam lever 31, which in turn, prevents rotational movement of the cam lever 31. To deactivate the safety lock 5, the user simply presses and holds down on the button 51. This causes the top of the engagement arm 52 to move downward, below the second recess 55 of the cam lever 31 and into the first recess 54 of the main body 2. While the safety lock 5 is deactivated, the user can freely move the cam lever 31 into an unlocked position.

In the preferred embodiment, the present invention further employs a second raised section and a second slot. The use of two raised sections provides increased rigidity and further minimizes any play or movement between the shank 42 and the main body 2. In particular, the at least one raised section 24 of the main body 2 further comprises a second raised section 28. As best seen in FIG. 8, the second raised section extends longitudinally outward from the proximal end 22, parallel with the first raised section 25. Moreover, the second raised section 28 is positioned in between the first raised section 25 and the second outer side 21 of the main body 2. The shank 42 further comprises a second slot 48. The second slot 48 is contoured to engage with the second raised section 28 of the main body 2.

In the preferred embodiment, the present invention further comprises a clevis joint 29. As best seen in FIG. 8, the clevis joint 29 is terminally connected to the proximal end 22 of the main body 2, positioned opposite of the at least one raised section 24. In this embodiment, the clevis joint 29 is adapted to receive a pivot pin 92. As best seen in FIG. 1, the entire tool holder assembly 1 can be pivotally connected to a folding handle 91 or any other type of handle that employs a pivot pin.

In the preferred embodiment, the present invention further comprises a cover 6. As best seen in FIG. 5, the cover 6 is preferably in the form of a metal plate and is detachably mounted to the main body 2 via a plurality of fasteners. However, the means of securing the cover 6 to the main body 2 is not limited to fasteners. The cover 6 can be secured by any suitable means including but not limited to adhesive bonding and tab fittings. In this embodiment, the cover 6 secures the shank 42 of the tool 4 to the main body 2. More specifically, the cam lock 3 prevents movement of shank 42 in the longitudinal direction, whereas the cover 6 prevents movement of the shank 42 in the lateral direction. Furthermore, the cover 6 can be adapted to secure the button 51 and the spring 53 in place.

In another embodiment, the present invention further comprises a thumb stud 7. As seen in FIGS. 3 and 4, the thumb stud 7 is terminally connected to the main body 2, positioned opposite of the cam lever 31. Preferably, the thumb stud 7 is identical in shape and size to the cam lever 31. This arrangement not only enhances the overall appearance of the present invention, but also improves the ergonomic handling when used as a folding knife 9.

In the preferred embodiment, the head 41 of the tool 4 is not limited in shape and can take the form of any suitable shape based on design, user, and/or manufacturing requirements. In another embodiment, the head 41 of the tool 4 is selected from the group consisting of: a knife, a saw, a fork, and a scraper. Stated another way, the head 41 can take the form of a knife, a saw, a fork, or a scraper.

In other embodiments, the present invention is not limited to the use of a cam lock 3. More specifically, the cantilever 43 of the shank 42 can be detachably connected to the main body 2 by any suitable means known to one of ordinary skill in the art. The means of attachment may include but are not limited to an elbow latch and a sloping surface (i.e., ramp). By way of example, the sloping surface can be integrated into the first raised section 25. When the cantilever 43 is fully inserted, the sliding engagement between the cantilever 43 and the sloping surface creates a bending force on the cantilever 43. The bending force on the cantilever 43 secures the shank 42 to the main body 2.

Although the invention has been explained in relation to its preferred embodiment, it is to be understood that many other possible modifications and variations can be made without departing from the spirit and scope of the invention.

What is claimed is:

1. A tool holder assembly comprising:
- a main body;
- a tool;
- a cam lock;
- the main body comprising a first outer side, a proximal end, a distal end, and at least one raised section;
- the at least one raised section extending longitudinally outward from the proximal end towards the distal end;
- the at least one raised section comprising a first raised section;
- the first raised section being positioned offset from the first outer side by a predefined length;
- the tool comprising a shank and a head;
- the shank further comprising a cantilever and a first slot;
- the first slot being disposed adjacent to the cantilever;
- the first slot being slidably engaged with the first raised section;
- the cam lock further comprising a cam pivot, a cam lever, and a cam lobe;
- the cam lobe being terminally connected to the cam lever;
- the cam lobe being oriented orthogonal to the cam lever;
- the cam lever being terminally connected to the cam pivot;
- the cam pivot being pivotally connected to the main body; and
- the cam lock capable of detachably connecting the shank to the main body, wherein the cam lever and the cam lobe are operably connected to the cantilever.

2. The tool holder assembly as claimed in claim 1 comprising:
- a cam lobe recess being disposed on a first surface of the cantilever;
- the cam lobe being operably coupled to the cam lobe recess;
- the first raised section further comprising a raised lobe;
- a raised lobe recess being disposed on a second surface of the cantilever; and
- the raised lobe being operably coupled to the raised lobe recess.

3. The tool holder assembly as claimed in claim 1 comprising:
- the at least one raised section further comprising a second raised section;
- the shank further comprising a second slot;
- the second raised section being parallel with the first raised section; and
- the second slot being engaged with the second raised section.

4. The tool holder assembly as claimed in claim 3 comprising:
a clevis joint;
the clevis joint being terminally connected to the proximal end of the main body; and
the clevis joint positioned opposite of the at least one raised section.

5. The tool holder assembly as claimed in claim 4 comprising:
a cover; and
the cover being detachably mounted to the main body.

6. The tool holder assembly as claimed in claim 1 comprising:
a thumb stud;
the thumb stud being terminally connected to the main body; and
the thumb stud being positioned opposite of the cam lever.

7. A tool holder assembly comprising:
a main body;
a tool;
a cam lock;
the main body comprising a first outer side, a proximal end, a distal end, and at least one raised section;
the at least one raised section extending longitudinally outward from the proximal end towards the distal end;
the at least one raised section comprising a first raised section;
the first raised section being positioned offset from the first outer side by a predefined length;
the tool comprising a shank and a head;
the shank further comprising a cantilever and a first slot;
the first slot being disposed adjacent to the cantilever;
the first slot being engaged with the first raised section;
the cam lock further comprising a cam pivot, a cam lever, and a cam lobe;
the cam lobe being terminally connected to the cam lever;
the cam lobe being oriented orthogonal to the cam lever;
the cam lever being terminally connected to the cam pivot;
the cam pivot being pivotally connected to the main body;
a cam lobe recess being disposed on a first surface of the cantilever;
the cam lobe being operably coupled to the cam lobe recess; and
the cam lock capable of detachably connecting the shank to the main body, wherein the cam lever and the cam lobe are operably connected to the cantilever.

8. The tool holder assembly as claimed in claim 7 comprising:
the first raised section further comprising a raised lobe;
a raised lobe recess being disposed on a second surface of the cantilever; and
the raised lobe being operably coupled to the raised lobe recess.

9. The tool holder as claimed in claim 7 comprising:
a safety lock;
the safety lock comprising a button, an engagement arm, and a spring;
the engagement arm being terminally connected to the button;
the button being positioned on the main body, adjacent to the cam lock;
a first recess being disposed on the main body;
the button and the engagement arm positioned within the first recess;
a second recess being disposed on a base surface of the cam lever;
the engagement arm extending into the second recess;
a third recess being disposed on a base surface of the button;
the spring being positioned within the third recess; and
the safety lock capable of securing the cam lever in a locked position.

10. The tool holder assembly as claimed in claim 7 comprising:
a clevis joint;
a cover;
a thumb stud;
the at least one raised section further comprising a second raised section;
the shank further comprising a second slot;
the second raised section being parallel with the first raised section;
the second slot being engaged with the second raised section;
the clevis joint being terminally connected to the proximal end of the main body;
the clevis joint positioned opposite of the at least one raised section;
the cover being detachably mounted to the main body;
the thumb stud being terminally connected to the main body; and
the thumb stud being positioned opposite of the cam lever.

11. A tool holder assembly comprising:
a main body;
a tool;
a cam lock;
a safety lock;
the main body comprising a first outer side, a proximal end, a distal end, and at least one raised section;
the at least one raised section extending longitudinally outward from the proximal end towards the distal end;
the at least one raised section comprising a first raised section;
the first raised section being positioned offset from the first outer side by a predefined length;
the tool comprising a shank and a head;
the shank further comprising a cantilever and a first slot;
the first slot being disposed adjacent to the cantilever;
the first slot being engaged with the first raised section;
the cam lock further comprising a cam pivot, a cam lever, and a cam lobe;
the cam lobe being terminally connected to the cam lever;
the cam lobe being oriented orthogonal to the cam lever;
the cam lever being terminally connected to the cam pivot;
the cam pivot being pivotally connected to the main body;
the cam lock capable of detachably connecting the shank to the main body, wherein the cam lever and the cam lobe are operably connected to the cantilever;
the safety lock comprising a button, an engagement arm, and a spring;
the engagement arm being terminally connected to the button;
the button being positioned on the main body, adjacent to the cam lock;
a first recess being disposed on the main body;
the button and the engagement arm positioned within the first recess;
a second recess being disposed on a base surface of the cam lever;
the engagement arm extending into the second recess;
a third recess being disposed on a base surface of the button;

the spring being positioned within the third recess; and the safety lock capable of securing the cam lever in a locked position.

12. The tool holder assembly as claimed in claim 11 comprising:

a clevis joint;

a cover;

a thumb stud;

the at least one raised section further comprising a second raised section;

the shank further comprising a second slot;

the second raised section being parallel with the first raised section;

the second slot being engaged with the second raised section;

the clevis joint being terminally connected to the proximal end of the main body;

the clevis joint positioned opposite of the at least one raised section;

the cover being detachably mounted to the main body;

the thumb stud being terminally connected to the main body; and the thumb stud being positioned opposite of the cam lever.

13. The tool holder assembly as claimed in claim 11 comprising:

a cam lobe recess being disposed on a first surface of the cantilever;

the cam lobe being operably coupled to the cam lobe recess;

the first raised section further comprising a raised lobe;

a raised lobe recess being disposed on a second surface of the cantilever; and the raised lobe being operably coupled to the raised lobe recess.

* * * * *